United States Patent
Scheer

(10) Patent No.: US 9,908,451 B2
(45) Date of Patent: Mar. 6, 2018

(54) TRANSPORT VEHICLE WITH EXTENDED LONGITUDINAL STRUCTURE FOR A MOTOR-DRIVEN HANDLING DEVICE

(71) Applicant: LOHR ELECTROMECANIQUE, Hangenbieten (FR)

(72) Inventor: Daniel Scheer, Still (FR)

(73) Assignee: LOHR ELECTROMECANIQUE, Hangenbieten (FR)

( * ) Notice: Subject to any disclaimer, the term of this patent is extended or adjusted under 35 U.S.C. 154(b) by 0 days.

(21) Appl. No.: 15/509,923

(22) PCT Filed: Sep. 3, 2015

(86) PCT No.: PCT/FR2015/052336
§ 371 (c)(1),
(2) Date: Mar. 9, 2017

(87) PCT Pub. No.: WO2016/038283
PCT Pub. Date: Mar. 17, 2016

(65) Prior Publication Data
US 2017/0253165 A1    Sep. 7, 2017

(30) Foreign Application Priority Data
Sep. 11, 2014   (FR) ...................................... 14 58523

(51) Int. Cl.
*B60P 1/54*      (2006.01)
*B60P 3/08*      (2006.01)

(52) U.S. Cl.
CPC .............. *B60P 1/5409* (2013.01); *B60P 3/08* (2013.01); *B60P 1/5442* (2013.01)

(58) Field of Classification Search
CPC ......... B60P 1/54; B60P 1/5442; B60P 1/5404; B60P 3/07; B60P 3/08
USPC .......... 414/542, 549, 555, 557; 410/24, 28.1
See application file for complete search history.

(56) References Cited

U.S. PATENT DOCUMENTS

| | | | |
|---|---|---|---|
| 3,482,715 A * | 12/1969 | Worthington | B60P 1/54 414/542 |
| 4,383,711 A * | 5/1983 | Dunbar | B62D 33/04 414/542 |
| 4,597,712 A * | 7/1986 | Smith | B60P 3/07 414/253 |

(Continued)

OTHER PUBLICATIONS

PCT Written Opinion, Translated, from parent PCT application PCT/FR2015/052336 dated Dec. 14, 2015, 4 pages.

(Continued)

*Primary Examiner* — James R Bidwell
(74) *Attorney, Agent, or Firm* — Tech Valley Patent, LLC; John Pietrangelo

(57) ABSTRACT

The invention relates to a transport vehicle with an extended longitudinal structure for a motor-driven handling device. Loads are loaded/unloaded in a loading space by a motor-driven handling device which moves along longitudinal guide rails supported by the vehicle. The transport vehicle is closed at the rear by two hinged doors, each door including a guide rail section located at the same height as the guide rails. When the hinged doors are open to 90 degrees, each guide rail section extends one of the guide rails, allowing the motor-driven handling device to move simultaneously on both the guide rails and the guide rail sections.

14 Claims, 3 Drawing Sheets

(56) References Cited

U.S. PATENT DOCUMENTS

| | | | | |
|---|---|---|---|---|
| 5,525,026 | A | 6/1996 | DeMonte et al. | |
| 8,356,962 | B2 * | 1/2013 | Crook | B60P 3/08 |
| | | | | 410/16 |
| 9,738,206 | B2 * | 8/2017 | Scheer | B60P 1/483 |
| 9,850,104 | B2 * | 12/2017 | Scheer | B66C 1/425 |
| 2003/0082037 | A1 * | 5/2003 | Khodkov | B60P 7/0838 |
| | | | | 414/546 |
| 2007/0020059 | A1 | 1/2007 | Rapelli | |
| 2015/0078869 | A1 * | 3/2015 | Plewes | B60P 1/5438 |
| | | | | 414/542 |

OTHER PUBLICATIONS

International Search Report from parent PCT application PCT/FR2015/052336 dated Dec. 14, 2015, 3 pages.

* cited by examiner

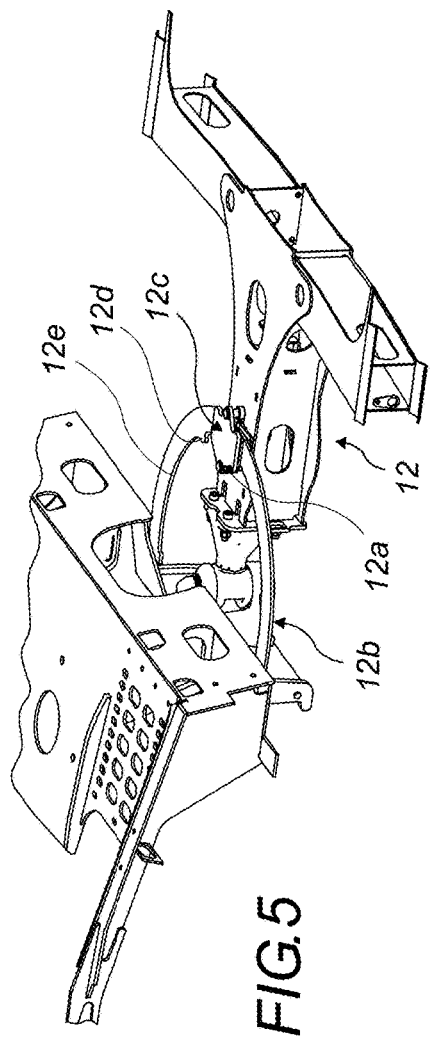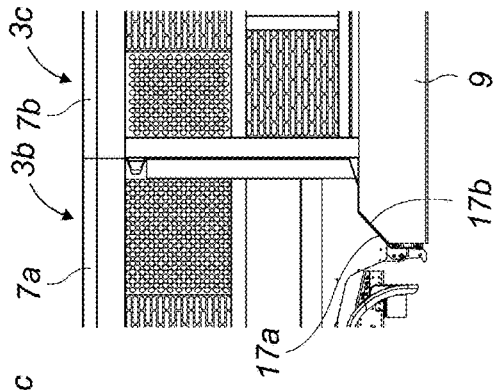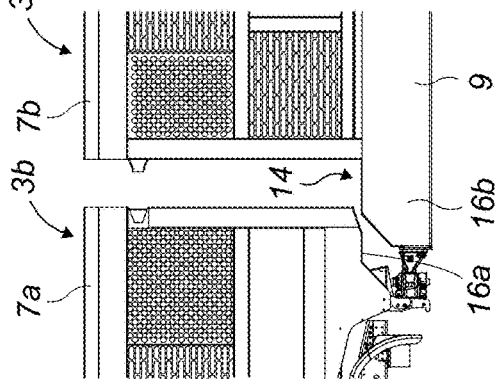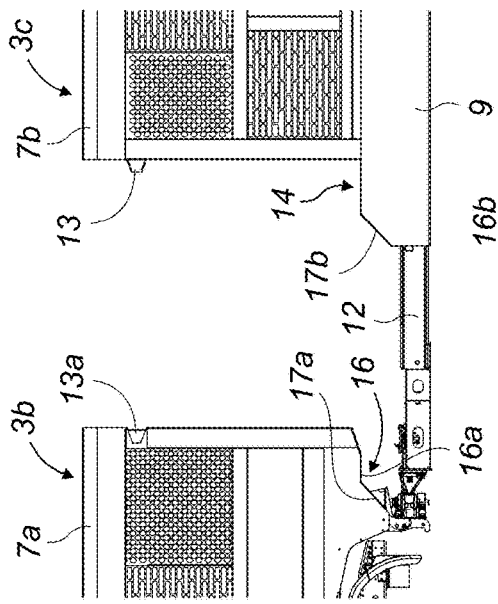

TRANSPORT VEHICLE WITH EXTENDED LONGITUDINAL STRUCTURE FOR A MOTOR-DRIVEN HANDLING DEVICE

CROSS-REFERENCE TO RELATED APPLICATIONS

This application is a § 371 filing of PCT application PCT/FR2015/052336 filed on Sep. 3, 2015, which claims priority from French application FR 1458523 filed on Sep. 11, 2014. The disclosures of these applications are included by reference herein in their entirety.

BACKGROUND

Technical Domain

The present invention relates to the general art of the transportation of freight, notably the transportation of loads placed on pallets. These loads are for example cars presenting the same or differing outlines.

More particularly, the invention concerns a road cargo vehicle for transporting loads, the loads of which are moved, oriented and deposited by a motor-driven handling device moving along guide rails supported by the vehicle. Said vehicle comprises means enabling the path of longitudinal movement of the handling device to be extended, and to enable passage of the handling device from one structure to another when the vehicle comprises two coupled loading structures.

Prior Art

Known, for example from the document U.S. Pat. No. 4,597,712, is an apparatus for loading and unloading semi-trailers. Said apparatus is mounted at the rear end of a loading space and comprises articulated arms for laterally gripping a vehicle based upon wheel supports and for moving the assembly to a loading position. The various operations and movements are controlled by an operator working at a control console. Such an apparatus has the disadvantage of being continuously controlled by an operator. In addition, the operator does not always have all of the information necessary for optimal loading, unloading, optimal transportation or distribution imposing special restrictions. Thus, it may occur that the loads, in this instance vehicles, are placed in non-optimal or even dangerous loading positions. A loading error can then only be corrected by again moving at least some loads. This would result in a substantial loss of time. The gripping of the cars, which must ensure by the positioning of the gripping arms that the car does not swing, is performed according to the judgment of an operator. The gripping can therefore prove to be a long operation, as well as a relatively dangerous one.

DISCLOSURE OF ASPECTS OF THE INVENTION

The object of the present invention is therefore to mitigate the disadvantages of the prior art by proposing a road cargo vehicle for transporting loads comprising a new loading/unloading device, the implementation of which is simple, fast and reliable.

The objects assigned to the invention are achieved by a road cargo vehicle for transporting loads wherein loads carried on pallets are moved, oriented and deposited in a loading space by a motor-driven handling device moving along a longitudinal structure of the vehicle, characterized in that:

the longitudinal structure comprises longitudinal guide rails supported by the vehicle along the loading space;
two hinged doors are provided to close the loading space at the rear of the vehicle;
each hinged door comprises a longitudinal guide rail section located at the same height as the guide rails;
when the hinged doors are opened to 90 degrees, each guide rail section extends one of the guide rails, allowing the motor-driven handling device to move on both the guide rails and the guide rail sections.

According to one embodiment, the guide rails are located at the upper part of the vehicle and the guide rail sections are located at the upper part of the hinged doors, when the articulated doors are opened to 90 degrees, each guide rail being located in the immediate proximity and along the same longitudinal axis as an associated guide rail section.

According to another embodiment, the hinged doors comprise hinges located on the inner faces of the loading space.

According to an alternative embodiment, the vehicle comprises two loading structures coupled together, each of them comprising a pair of guide rails for the movement of the motor-driven handling device, and it further comprises elements of convergence of the guide rails supported by each of the loading structures so that each pair of guide rails of one loading structure is brought into the immediate proximity of the pair of guide rails of the other loading structure or vice versa.

According to said alternative embodiment, the elements of convergence can comprise a telescopic towbar, telescopic guide rails, a helical system of the screw-nut type or any other known elements of convergence.

According to said alternative embodiment, the elements of convergence can be capable of moving one loading structure with respect to the other loading structure.

According to another alternative embodiment, the vehicle comprises a tractor and semi-trailer, said semi-trailer supporting the loading structure. According to a further alternative embodiment, the vehicle comprises a tractor supporting the loading structure and a coupled trailer supporting the other loading structure.

According to a previous alternative embodiment, the vehicle can comprise a centering system to compensate for a slight offset between the front and rear guide rails during convergence of the two loading structures, said centering system comprising a pair of engagement cones and recesses of a complementary shape, provided on the respective ends of each guide rail.

The vehicle can also comprise a compensation system capable of compensating for a slight roll, pitch and yaw between the bases of the loading structures during their mutual convergence, said compensation system comprising engagement parts of complementary shape on bases, which parts comprise a recessed female engagement part provided at the rear of the base of the front loading structure and a projecting male engagement part provided at the front of the base of the rear loading structure.

According to said alternative embodiment, each of the engagement parts can have a sloped part serving as a guide ramp and stop for receiving the male engagement part within the female engagement part.

One advantage of the vehicle according to the invention is the high degree of automation of loading and unloading operations.

Another advantage of the vehicle according to the invention is a substantial savings of time during loading and unloading operations. Indeed, the automation of these operations allows the operator, for example when loading cars, to search for another car to load while the automated device proceeds with the automated placement of a car in its loading position. Similar time savings are observed during unloading operations.

Another advantage of the vehicle according to the invention is in the high reliability it achieves, in spite of a high degree of automation.

Another advantage of the loading/unloading device according to the invention is the fact that it is adapted to loads of different kinds.

Another advantage of the vehicle according to the invention is the fact that it allows very easy loading and unloading, and in complete safety, of different loading spaces of an articulated unit, composed for example of a trailer coupled to a motor-driven vehicle.

Another advantage of the vehicle according to the invention is in achieving an increased path of movement for a cart moving the motor-driven handling device.

BRIEF DESCRIPTION OF THE DRAWINGS

Other characteristics and advantages of the present invention will be seen more clearly from the following description, provided with reference to the appended drawings, provided by way of non-limiting examples, wherein:

FIG. 5 is a partial view in perspective of an embodiment of a towbar of a vehicle according to the invention, comprising a means for verifying the alignment of its two loading structures; and FIGS. 6a, 6b and 6c illustrate an example of convergence between two loading structures of a vehicle according to the invention.

EMBODIMENT(S) OF THE INVENTION

The structurally and functionally identical elements shown in several different figures are assigned the same numerical or alphanumerical reference.

Figure 1:
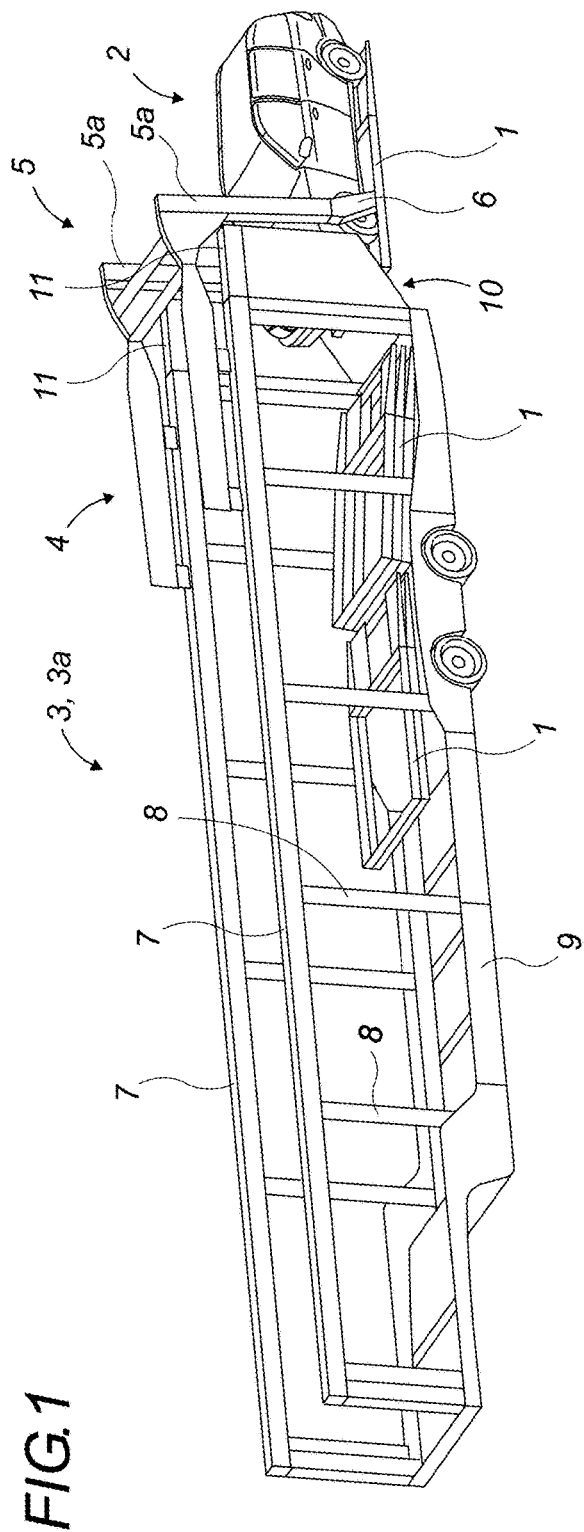
FIG. 1 is a view in perspective of one embodiment of a vehicle according to the invention that can be loaded and unloaded using pallets handled by the motor-driven handling device, the vehicle being a semi-trailer shown during an operation of gripping and loading a pallet supporting a car by the motor-driven handling device.

FIG. 1 illustrates a loading phase in which a pallet 1 supports a load 2, in this instance a car, during loading onto a vehicle 3, for example a semi-trailer 3a.

The loaded pallet 1 is moved by means of a motor-driven handling device 5 which grips the pallet 1 by grippers 6. The pallet 1 is gripped or hooked by the gripper 6 on each of its sides and more specifically on each of its side longitudinal beams.

A cart 4 supporting the handling device 5 is moved on longitudinal guide rails 7, i.e. extending along and on either side of a defined loading space within the semi-trailer 3a. The guide rails 7 are preferably situated at the top of the loading space.

The cart 4 allows the manipulator 5 and consequently the pallet 1 to move within the loading space.

The side arms 5a are advantageously telescopic and hinged on the cart 4, and the grippers 6 are in turn hinged on the lower extremities of said side arms 5a.

The manipulator 5 allows, on the one hand, the palette 1 to be moved in a vertical direction and in a horizontal direction, and on the other hand the orientation of the pallet 1 to be changed by means of the grippers 6.

The movement and orientation of the pallet 1 is notably achieved by means of actuators, such as hydraulic cylinders which will not be further described in detail here. It is also possible to use electric or pneumatic actuators.

On its sides, the vehicle 3 can have lateral walls comprising a support structure for the pallets 1. The support structure advantageously extends between the uprights 8 connecting a base 9 of the vehicle 3 to the guide rails 7.

At the rear, the vehicle 3 comprises two hinged doors 10 provided in order to close the loading space. Each hinged door 10 comprises a guide rail section 11, preferably at the upper part of the doors 10, and located at the same height as the guide rails 7.

Thus, when the hinged doors 10 are opened to 90 degrees, each guide rail section 11 extends one of the guide rails 7 to form an extended guide rail, allowing the handling device 5 to move both on the guide rails 7 and on the guide rail sections 11, thus extending its path towards the rear.

When the hinged doors 10 are opened to 90 degrees, each guide rail section 11 is preferably located in the immediate proximity of one of the guide rails 7, in the extension thereof, and along the same longitudinal axis. Thus, when it moves along the extended guide rails 7, the handling device 5 does not encounter any discontinuity of rail that could hinder its operation. The hinges of the doors 10 are preferably provided on the side of the inner faces of the loading space.

Figure 2:
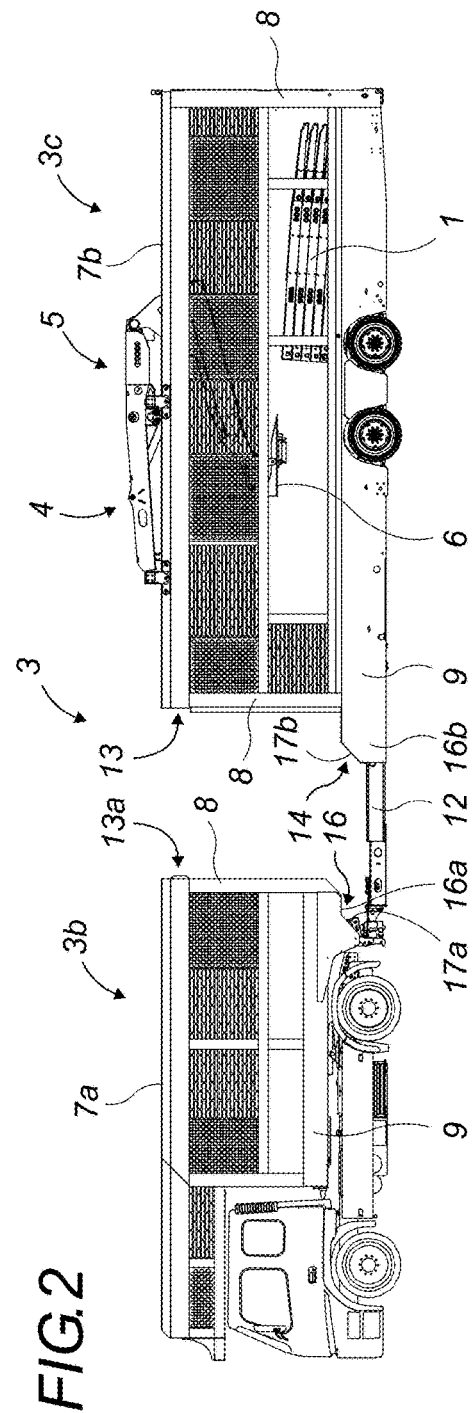
FIG. 2 is a view in profile of an embodiment of a vehicle according to the invention, the vehicle being a vehicle with two coupled loading structures shown empty in driving configuration.
Figure 3:
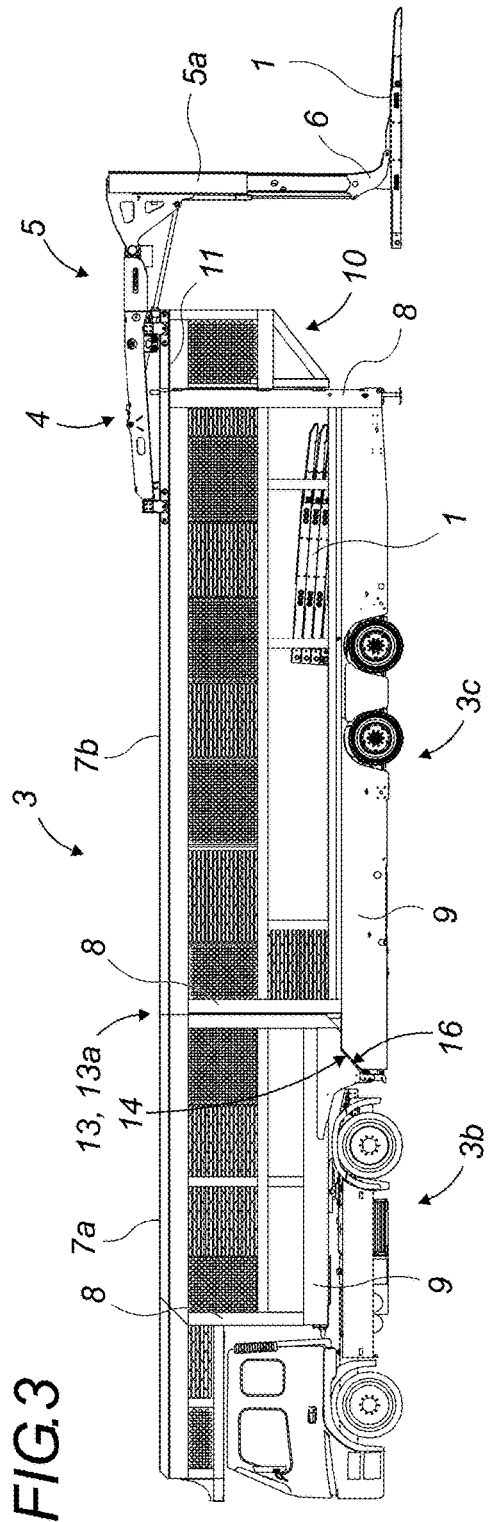
FIG. 3 illustrates the vehicle of FIG. 2 shown empty in a loading/unloading configuration.
Figure 4:
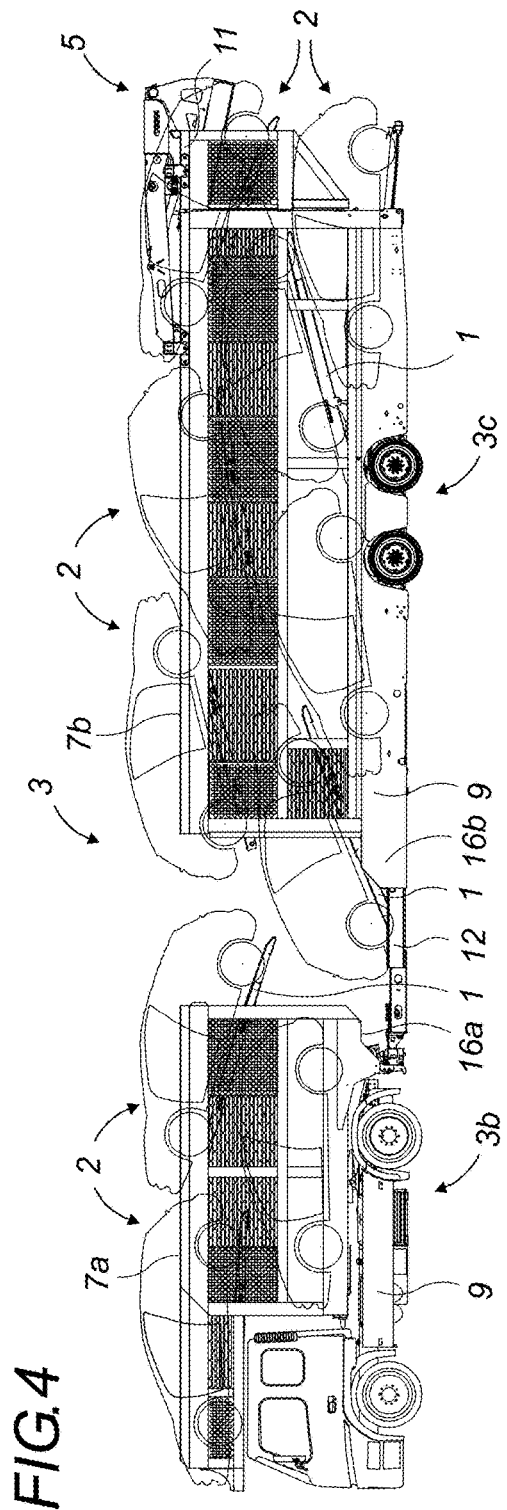
FIG. 4 illustrates the vehicle of FIG. 2 shown fully loaded in a driving configuration.

FIGS. 2 to 4 illustrate a vehicle 3 comprising a front loading structure 3b and another rear loading structure 3c. Said loading structures 3b and 3c are coupled together by a towbar 12 connecting a tractor supporting the front loading structure 3b to a trailer supporting the rear loading structure 3c. The loading structures 3b and 3c each comprise a pair of guide rails 7a, 7b in order to ensure the movement of the handling device 5 via the cart 4.

When the vehicle 3 is moved, it is necessary to have a space between the loading structures 3b and 3c in order to allow the pivoting of the one with respect to the other in curves. Thus, in the driving position represented in FIGS. 2 and 4, the loading structures 3b and 3c are separated and consequently their front guide rails 7a and rear guide rails 7b are not in the immediate proximity of each other.

In the loading/unloading position, in order to enable the movement of the handling device 5 along the guide rails 7a, 7b, said guide rails 7a, 7b must be placed in the immediate proximity of each other.

A first solution consists, for example, of using elements of convergence comprising a telescopic towbar 12. Thus, when it is necessary for the vehicle 3 to be loaded or unloaded, the telescopic towbar 12 is retracted so as to converge the loading structures 3b and 3c until their guide rails 7a, 7b are in the immediate vicinity of each other or in contact. When it is necessary for the vehicle 3 to be moved, the telescopic towbar 12 is again deployed into the driving position.

A second solution consists, for example, in using elements of convergence comprising telescopic guide rails 7a and/or 7b. Thus, when the vehicle 3 must be loaded or unloaded, at least one of the guide rails 7a and 7b is telescopic and is deployed in such a way as to mutually converge with the other guide rails 7b and 7a until they are in the immediate proximity of each other or in contact. When it is necessary for the vehicle 3 to be moved, the telescopic guide rails 7a and/or 7b are retracted again into the driving position.

The vehicle 3 according to the invention can also comprise detection means making it possible to verify the alignment between the loading structures 3b and 3c. Such detection means, illustrated for example in FIG. 5, comprise for example a position detector 12a which determines the relative alignment. The vehicle 3 is provided for that purpose with a track 12b, such as a metal ring, articulated on the bodywork thereof, for example on the base 9 of the loading structure 3b. Said track 12b extends partly above the towbar 12 while being grasped by jaws 12c attached to said towbar 12.

The position detector 12a is disposed on the jaws 12c, and the track 12b has a tab 12d projecting from the inner circumference 12e of the track 12b. The dimensions and position of the tab 12d are such that in the absence of yaw, i.e. when the loading structures 3b and 3c are aligned, said tab 12d is facing the position detector 12a. Said position detector transmits information relative to said alignment to the operator, for example by means of a lighted or audible indicator. The operator then knows if he is allowed to mutually converge the loading structures 3b and 3c.

Indeed, during said convergence, it is important that the loading structures 3b and 3c be substantially aligned, so that their front guide rails 7a and rear guide rails 7b can be located in the immediate proximity of each other along the same longitudinal axis and this on both sides of the loading structures 3b and 3c. The detection means therefore allows information to be provided with respect to possible defective yaw alignment, preventing a convergence of the two structures 3b and 3c. The operator can then maneuver, before converging the loading structures 3b and 3c, in order to correct the yaw of the articulated unit. Thus, when the angle of yaw between the two structures 3b and 3c is within the required range, the alignment of the articulated unit is acceptable, which is indicated by means of a visual or audible signal. The convergence of the two structures 3b and 3c can then be achieved.

After the correction of any yaw, depending on the situation it may be necessary to correct the roll and/or pitch, particularly in the case of curvature of the roadway. To that end, the vehicle 3 according to the invention can also comprise a correction system for the loading structures 3b and 3c. Said correction system, illustrated for example in FIGS. 6a, 6b and 6c, comprises for example centering elements for the guide rails 7a, 7b and shoes 14. FIGS. 6a, 6b and 6c show relative positions between the two loading structures 3b and 3c during a convergence phase.

The shoes 14 comprising male engagement parts 16b, situated at the front extremity of the longitudinal beams of the base 9 advantageously have a sloped part 17b to facilitate the guiding and engagement within the female engagement parts 16a of a complementary shape 16 provided at the rear extremity of the longitudinal beams of the other base 9.

The female engagement parts 16a advantageously have a sloped face 17a against which the male engagement part 16b of the corresponding shoes 14 come in abutment when the convergence of the loading structures 3b and 3c is completed.

The centering elements comprise for example engagement cones 13 within the extension of the guide rails 7b and recesses 13a of a complementary shape, intended to receive said engagement cones 13. The centering elements thus make it possible to properly align the two extremities of the guide rails 7a, 7b and to add rigidity to the loading structure as a whole during the loading and unloading phases.

The engagement of the shoes 14 within the complementary shapes 16, on the one hand, and the engagement of the cones 13 within the recesses 13a, make it possible, thanks to the stresses absorbed by the suspensions of the structures 3b and 3c, to compensate for slight defects in alignment for roll, pitch and yaw between the two structures 3b and 3c coming into contact with each other during their convergence.

Situated in the extension of the guide rail sections 11 of the doors 10 in the open position, the guide rails 7a, 7b form with said guide rail sections 11 an extended guide rail allowing the carts 4 supporting the handling device 5 to be moved from one to the other over the full length thereof in a configuration similar to what is illustrated in FIG. 1 or 3.

FIG. 4 illustrates a vehicle 3 comprising two loading structures 3b and 3c fully loaded with cars. It is represented in the driving position, i.e. with the loading structures 3b and 3c separated from each other.

In order to maximize the number of cars thus transported, the last car disposed in the lower position at the rear of the loading structure 3c is loaded onto an extendable platform reaching the ground for loading, and then raised into the driving position. The car disposed in the upper position at the rear of the loading structure 3c is, as for it, loaded onto a pallet 1 that can be supported in part by the doors 10 in the open position.

The vehicle according to the invention also makes it possible to implement a method for loading/unloading a road cargo vehicle 3 for transporting loads utilizing the motor-driven handling device 5 being guided in movement on longitudinal guide rails 7, in order to reach each one of determined loading positions. Said loading/unloading method is preferably controlled by an on-board programmable logic controller (PLC).

In one embodiment of the loading/unloading method according to the invention, the following steps are performed successively.

During a first step a), primary data relating to the loads 2 are entered or imported into the PLC. Said primary data are related for example to the dimensions, weight and/or preferential orientation of each load 2.

During a step b), by means of the PLC the optimal position of loading for each load 2 is determined based on the primary data and on supplementary data relating to loading/unloading, transport and/or distribution of loads restrictions. Said supplementary data are for example entered by the operator.

During a step c), the automated movements of the motor-driven handling device 5 are determined by means of the PLC.

During a step d), a pallet 1 is automatically gripped by the handling device 5 in a storage position in the loading space and said pallet 1 is positioned in a loading position located at the rear of the vehicle 3. The pallet 1 is for example set flat on the ground.

In a step e), a load 2 is then placed on the pallet 1.

During a step f), the pallet 1 supporting the load 2 is moved automatically by means of the handling device 5 into its optimal loading position, and said pallet 1 loaded onto the support structures of the vehicle 3 is automatically locked.

For unloading purposes, all of the recorded data relating to the loading are used to determine, according to a step g), a sequence of unloading the loaded pallets 1 disposed in the loading space.

Then, according to a step h), the loaded pallet 1 is automatically unlocked and moved by the handling device 5 towards an exterior unloading position at the rear of the vehicle.

According to a step i), the load 2 is released from the pallet 1.

Finally, according to a step j), the empty pallet 1 is returned automatically by the handling device 5 and deposited in the storage position in the loading space.

The loading positions and unloading positions are generally located either directly on the ground, or on a loading platform.

According to one embodiment according to the invention, the method consists in repeating the loading operations d) to f) and unloading operations g) to j) in such a way as to completely load, respectively unload, the vehicle 3.

According to one embodiment according to the invention, the method advantageously comprises the additional step which consists of opening the hinged doors 10 to 90 degrees prior to the step d). Said doors 10 are closed again upon completion of loading if no load 2 is blocking said manual or assisted closing.

In the case of a vehicle 3 comprising two loading structures 3b and 3c coupled together, the method advantageously comprises the additional step consisting of converging the guide rails 7a, 7b in immediate proximity to each other prior to the step d).

Also, prior to the step d) the loading structures 3b and 3c should be converged by retracting the telescopic towbar 12.

According to an embodiment according to the invention, the method consists, upon completion of the loading/unloading operations, of retracting the handling device 5 into a defined transport position on the support structures.

In the different figures, the loads 2 are represented in the form of cars by way of example, although it is obvious to a person skilled in the art that the invention is perfectly suited to the loading/unloading any type of load.

Similarly, the vehicles represented in the figures are given only by way of example and the invention relates to any type of vehicle for loading/unloading loads in a loading space, by the motor-driven handling device 5 being moved along longitudinal guide rails 7 supported by the vehicle 3.

It is evident that this description is not limited to the examples explicitly described, but that it also includes other embodiments and/or implementations. Thus, one described technical characteristic can be replaced by an equivalent technical characteristic and one described operating step can be replaced by an equivalent step without departing from the scope of the invention.

The invention claimed is:

1. A road cargo vehicle for transporting loads carried on pallets within a loading space, the pallets moved by a handling device adapted to move along a longitudinal structure of the vehicle,
    wherein the longitudinal structure comprises longitudinal guide rails on the vehicle, the longitudinal guide rails extending along the loading space;
    wherein the vehicle includes two hinged doors adapted to close the loading space at a rear of the vehicle;
    wherein each of the hinged doors comprises a longitudinal door guide rail section located at a same height as the longitudinal guide rails; and
    wherein, when the two hinged doors are opened, each door guide rail section extends one of the longitudinal guide rails, allowing the handling device to move both on the longitudinal guide rails and on the door guide rail sections.

2. The vehicle according to claim 1, wherein longitudinal the guide rails are located at an upper part of the vehicle and wherein each of the door guide rail sections are located at an upper part of the two hinged doors, and wherein, when the two hinged doors are opened, each of the door guide rail sections are positioned in the immediate proximity to and along a same longitudinal axis as one of the longitudinal guide rail sections.

3. The vehicle according to claim 1, wherein the two hinged doors comprise hinges situated on inner faces of the loading space.

4. The vehicle according to claim 1, wherein the loading structure comprises two loading structures coupled together, and wherein the longitudinal guide rails compromise a front pair of guide rails on one of the two loading structures and a rear pair of guide rails on the other of the two loading structures, and wherein the vehicle further comprises elements of convergence supported by each of the two loading structures, wherein the elements of convergence are adapted to bring the front pair of guide rails and the rear pair of guide rails into immediate proximity.

5. The vehicle according to claim 4, wherein the elements of convergence comprise a telescopic towbar.

6. The vehicle according to claim 4, wherein the elements of convergence comprise telescopic guide rails.

7. The vehicle according to claim 4, wherein the elements of convergence are adapted to move one of the two loading structures with respect to the other of the two loading structures.

8. The vehicle according to claim 1, wherein the vehicle comprises a tractor and a semi-trailer, and wherein the semi-trailer supports the loading structure.

9. The vehicle according to claim 4, wherein the vehicle comprises a tractor supporting one of the two loading structures and a coupled trailer supporting the other of the two loading structures.

10. The vehicle according to claim 4, wherein the vehicle further comprises a centering system adapted to compensate for offset between the front pair of guide rails and the rear pair of guide rails, the centering system comprising a pair of engagement cones and recesses of complementary shape.

11. The vehicle according to claim 4, wherein the vehicle further comprises a compensation system adapted to compensate for at least one of roll, pitch, and yaw between one of the two loading structures and the other of the two loading structures, the compensation system comprising engagement parts of complementary shape, the engagement parts comprising a recessed female engagement part and a projecting male engagement part.

12. The vehicle according to claim 11, wherein each of the male engagement part and the female engagement part has a sloped part serving as a guide ramp or as a stop for reception of the male engagement part within the female engagement part.

13. The vehicle according claim 1, wherein the handling device comprises a motor-driven handling device.

14. The vehicle according claim 1, wherein the two hinged doors are each opened to 90 degrees.

* * * * *

UNITED STATES PATENT AND TRADEMARK OFFICE
CERTIFICATE OF CORRECTION

| | |
|---|---|
| PATENT NO. | : 9,908,451 B2 |
| APPLICATION NO. | : 15/509923 |
| DATED | : March 6, 2018 |
| INVENTOR(S) | : Daniel Scheer |

It is certified that error appears in the above-identified patent and that said Letters Patent is hereby corrected as shown below:

In the Claims

Column 8, Claim 2, Lines 1-2: Replace "longitudinal the" with "the longitudinal"

Column 8, Claim 4, Line 3: Replace "compromise" with "comprise"

Signed and Sealed this
First Day of May, 2018

Andrei Iancu
*Director of the United States Patent and Trademark Office*